(12) United States Patent
Tischler et al.

(10) Patent No.: US 7,043,593 B1
(45) Date of Patent: May 9, 2006

(54) APPARATUS AND METHOD FOR SENDING IN ORDER DATA AND OUT OF ORDER DATA ON A DATA BUS

(75) Inventors: Brett A. Tischler, Longmont, CO (US); Kenneth J. Kotlowski, Berthoud, CO (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 363 days.

(21) Appl. No.: 10/425,574

(22) Filed: Apr. 29, 2003

(51) Int. Cl.
*G06F 13/00* (2006.01)

(52) U.S. Cl. ........................ 710/311; 710/306
(58) Field of Classification Search ................ 710/305, 710/306, 310, 311
See application file for complete search history.

(56) References Cited

U.S. PATENT DOCUMENTS

| | | | |
|---|---|---|---|
| 5,949,981 A * | 9/1999 | Childers | 710/310 |
| 5,986,677 A * | 11/1999 | Jones et al. | 345/531 |
| 6,138,192 A * | 10/2000 | Hausauer | 710/100 |
| 6,363,466 B1 * | 3/2002 | Anand | 711/169 |
| RE38,428 E * | 2/2004 | Kelly et al. | 710/110 |
| 6,732,208 B1 * | 5/2004 | Alsaadi et al. | 710/112 |
| 6,754,737 B1 * | 6/2004 | Heynemann et al. | 710/39 |

FOREIGN PATENT DOCUMENTS

GB 2288256 A * 10/1995

* cited by examiner

*Primary Examiner*—Glenn A. Auve
(74) *Attorney, Agent, or Firm*—Toler Larson & Abel, LLP

(57) ABSTRACT

A master unit and a slave unit in a data processor are coupled together by a data bus. The master unit sends data transactions to the slave unit through the data bus and the slave unit executes the data transactions. The present invention comprises an apparatus and method for executing a data transaction either (1) by executing the data transaction "in order" with respect to other data transactions received by the slave unit, or (2) by executing the data transaction "out of order" with respect to other data transactions received by the slave unit. The master unit assigns a priority identifier to each data transaction. The slave unit reads the priority identifier to determine whether to execute the data transaction "in order" or "out of order" with respect to the other data transactions.

18 Claims, 5 Drawing Sheets

APPARATUS AND METHOD FOR SENDING IN ORDER DATA AND OUT OF ORDER DATA ON A DATA BUS

TECHNICAL FIELD OF THE INVENTION

The present invention is generally directed to data processors and, in particular, to a data processor that is capable of sending "in order" data on a data bus and capable of sending "out of order" data on the same data bus.

BACKGROUND OF THE INVENTION

In recent years, there have been great advancements in the speed, power, and complexity of integrated circuits, such as application specific integrated circuit (ASIC) chips, random access memory (RAM) chips, microprocessor (µP) chips, and the like. These advancements have made possible the development of system-on-a-chip (SOC) devices. An SOC device integrates into a single chip many of the components of a complex electronic system, such as a wireless receiver (i.e., cell phone, a television receiver, and the like). SOC devices greatly reduce the size, cost, and power consumption of the system.

SOC data processors are characterized by a very high degree of integration on a single integrated circuit (IC) chip. Many of the peripheral components now integrated onto the same IC chip as a processor core would have been implemented as separate IC chips in a previous generation of processors. Advantageously, this decreases the amount of board space required, reduces the effects of noise, allows for low-voltage operations, and, in many cases, reduces the pin count of the SOC device.

SOC devices comprise a plurality of individual modules that communicate with each other by sending data over one or more internal data buses. For convenience, a module that sends data over a data bus may be referred to as a "master unit" and a module that receives data over a data bus may be referred to as a "slave unit." Data transmissions over a data bus in a SOC processor may comprise a plurality of individual packets of data. An individual packet of data may comprise, for example, sixty four (64) bits of data. A data transmission of a single packet of data over a data bus may be referred to as a "data transaction."

There are generally two types of data buses available for use in a SOC device. The first type of data bus is referred to as an "in order" data bus. The second type of data bus is referred to as an "out of order" data bus. When a master unit sends a plurality of data transactions over an "in order" data bus, the slave unit receives the data transactions and executes the data transactions exactly in the order that they are received by the slave unit. That is why the data bus is referred to as an "in order" data bus. The data transactions are executed in order of their arrival in the slave unit.

On the other hand, when a master unit sends a plurality of data transactions over an "out of order" data bus, the slave unit receives the data transactions in the order in which they were sent by the master unit, but the slave unit does not necessarily execute the data transactions in the order in which they were received.

When the slave unit receives data transactions on an "in order" bus, the slave unit cannot reorder the execution of the data transactions to optimize the utilization of slave unit resources (e.g., dynamic random access memory). When the slave unit receives data transactions on an "out of order" bus, however, the slave unit can reorder the execution of the data transactions to optimize the utilization of slave unit resources. But the use of an "out of order" bus increases latencies for the master unit and requires the master unit to provide reordering buffering for the data transactions. In some cases the order in which the data transactions are to be executed by the slave unit is relevant. In those cases the use of an "out of order" bus prevents the master unit from controlling the ordering of the data transactions.

Therefore, there is a need in the art for an apparatus and method for sending "in order" data transactions and "out of order" data transactions on the same data bus. In particular, there is a need in the art for improved system-on-a-chip (SOC) devices and other large-scale integrated circuits in which a master unit is capable of specifying which data transactions are to be handled "in order" with respect to other data transactions and which data transactions are to be handled "out of order" with respect to other data transactions.

SUMMARY OF THE INVENTION

To address the above-discussed deficiencies of the prior art, it is a primary object of the present invention to provide a data processing system in which a master unit that sends data transactions over a data bus is capable of specifying which data transactions are to be handled "in order" with respect to other data transactions and which data transactions are to be handled "out of order" with respect to other data transactions.

In one advantageous embodiment of the present invention a data processor comprises a master unit and a slave unit. The master unit and the slave unit are coupled together by a mixed order data bus. The master unit sends data transactions to the slave unit through the mixed order data bus and the slave unit executes the data transactions. The present invention comprises an apparatus and method for executing a data transaction either (1) by executing the data transaction "in order" with respect to other data transactions received by the slave unit, or (2) by executing the data transaction "out of order" with respect to other data transactions received by the slave unit.

An execution order assignment unit in the master unit assigns a value of a priority identifier to each data transaction. A "priority identifier" is a value that indicates whether the data transaction is to be sent and executed "in order" or is to be sent and executed "out of order." The master unit also assigns a source identifier to each data transaction. The "source identifier" is a value that indicates which unit of a plurality of units is the source of the data transaction. The execution order assignment unit sends the data transaction to the slave unit over the mixed order data bus. An execution order analysis unit in the slave unit reads the priority identifier value in the data transaction to determine whether to execute the data transaction "in order" or "out of order" with respect to the other data transactions.

It is an object of the present invention to provide an apparatus and method for sending "in order" data transactions and "out of order" data transactions on the same data bus.

It is also an object of the present invention to provide an improved system-on-a-chip (SOC) device that is capable of sending data transactions from a master unit to a slave unit over a mixed order data bus in which the master unit may specify whether a data transaction is to be handled "in order" or "out of order" with respect to other data transactions received by the slave unit.

It is another object of the present invention to provide an execution order assignment unit in a master unit and an execution order analysis unit in a slave unit for executing a data transaction either "in order" or "out of order" with respect to other data transactions.

It is yet another object of the present invention to provide a plurality of bits in a data transaction to represent a priority identifier for the data transaction.

It is another object of the present invention to provide a plurality of bits in a data transaction to represent a source identifier for the data transaction.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the Detailed Description of the Invention below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior uses, as well as future uses, of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 7, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged system-on-a-chip (SOC) device.

Figure 1:
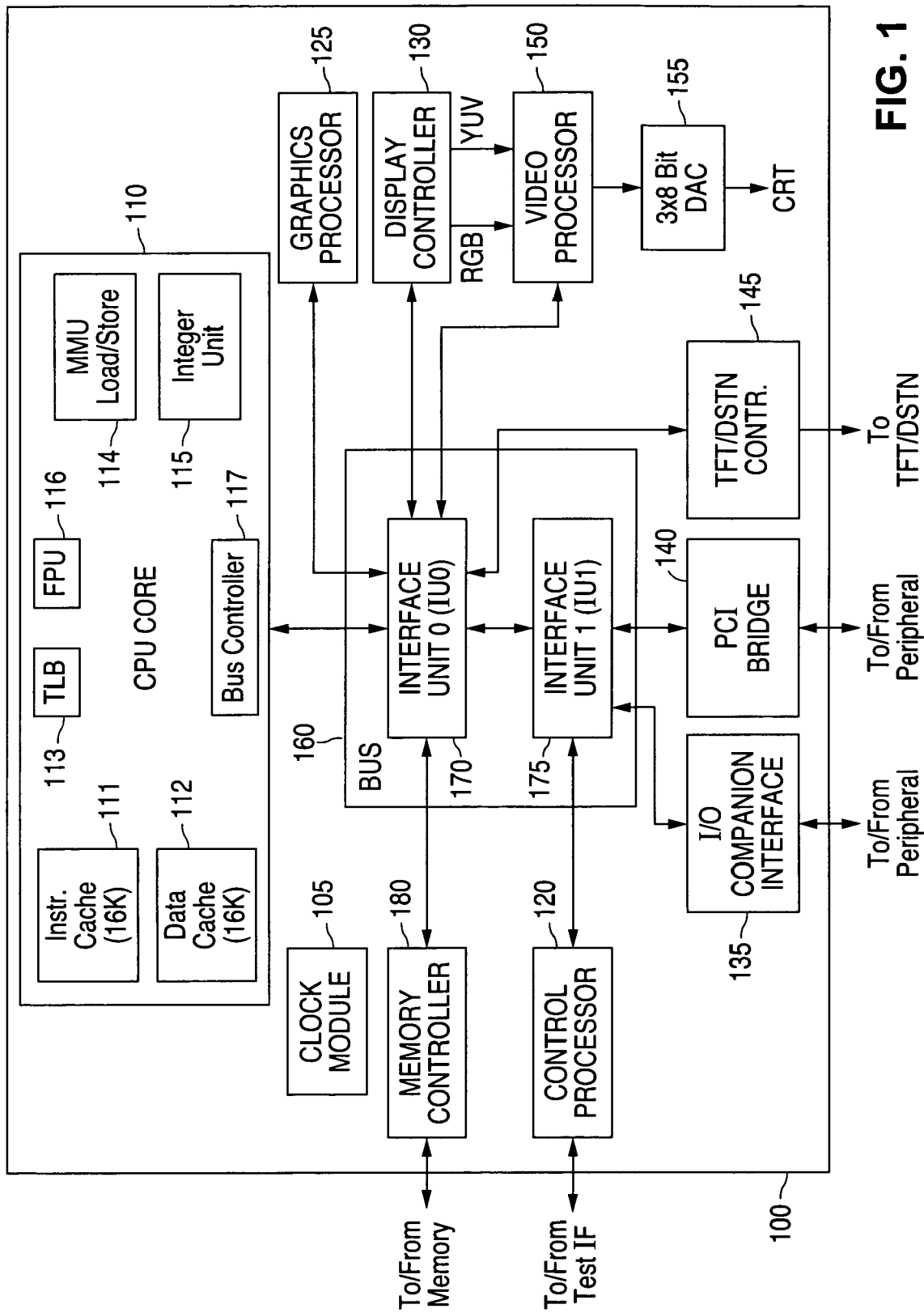
FIG. 1 illustrates an exemplary processing system according to an advantageous embodiment of the present invention.

FIG. 1 illustrates exemplary processing system 100 according to one embodiment of the present invention. In the exemplary embodiment, processing system 100 is a highly integrated system-on-a-chip (SOC) device designed to power information appliances (IA) for entertainment, educational, and/or business purposes. However, this is by way of illustration only and those skilled in the art will recognize that the present invention may be integrated into other types of SOC devices, such as cell phone transceivers, television receivers, radio receivers, and the like.

Processing system 100 comprises clock module 105, central processing unit (CPU) core 110, control processor 120, graphics processor 125, display controller 130, input/output (I/O) companion interface (IF) 135, peripheral component interconnect (PCI) bridge 140, TFT/DSTN controller 145, video processor 150, three (3)×eight (8) bit digital to analog converter (DAC) 155, internal bus 160, and memory controller 180.

CPU core 110 comprises instruction cache 111, data cache 112, translation look-aside buffer (TLB) 113, memory management unit (MMU) load/store block 114, integer unit (IU) 115, floating point unit (FPU) 116, and bus controller 117. According to an exemplary embodiment of the present invention, instruction cache 111 is sixteen (16) kilobytes and data cache 112 is sixteen (16) kilobytes. Internal bus 160 comprises interface unit 0 (IU0) 170 and interface unit 1 (IU1) 175.

According to an exemplary embodiment of the present invention, CPU core 110 is an x86 compatible device and FPU 116 is an x87 compatible device. The instruction set supported by CPU core 110 may be a combination of the instruction sets implemented by the Intel Pentium™ processor, the AMD™ K6 and K7 processors, and the National Semiconductor Corporation™ (NSC) GX1 processor.

Integer unit 115 comprises an instruction pipeline and associated logic. According to an exemplary embodiment, integer unit 115 consists of a single-issue eight-stage pipeline. The eight stages of the instruction pipeline in integer unit 115 are:

1) Instruction Pre-fetch stage;
2) Instruction Pre-decode stage;
3) Instruction Decode stage;
4) Instruction Queue stage;

5) Address Calculation 1 stage;
6) Address Calculation 2 stage;
7) Execution Unit stage; and
8) Writeback stage.

In the Instruction Pre-fetch stage, the raw instruction is fetched from the instruction memory cache. The Instruction Pre-decode stage extracts prefix bytes from the raw instruction bits. The pre-decode operation looks-ahead to the next instruction and a potential bubble can be eliminated if the pipeline stalls downstream. The Instruction Decode stage performs full decode of the instruction data and indicates the instruction length back to the Pre-fetch stage, thereby allowing the Pre-fetch stage to shift the appropriate number of bytes to the beginning of the next instruction.

The Instruction Queue stage comprises a FIFO containing decoded x86 instructions. The Instruction Queue allows the Instruction Decode stage to proceed even if the pipeline is stalled downstream. Register read operations for data operand address calculations are performed in the Instruction Queue stage. The Address Calculation 1 stage computes the linear address of operand data (if required) and issues requests to data cache 112. Microcode can take over the pipeline and inject a micro-box if multi-box instructions require additional data operands. In Address Calculation 2 stage, operand data (if required) is returned and set up to the Execution Unit stage with no bubbles if there was a data cache hit. Segment limit checking also is performed on the data operand address. The micro-read-only-memory (μROM) is read for setup to Execution Unit stage.

In the Execution Unit stage, register and/or data memory fetches are fed through the Arithmetic Logic Unit (ALU) for arithmetic or logical operations. The μROM always fires for the first instruction box into the pipeline. Microcode may control the pipeline and insert additional boxes in the Execution Unit stage if the instruction requires multiple Execution Unit stages to complete. The Writeback stage writes results of the Execution Unit stages to the register file or to data memory.

The memory subsystem of CPU core 110 supplies integer unit 115 pipeline with instructions, data, and translated addresses. To support efficient delivery of instructions, the memory subsystem uses instruction cache 111 and TLB 113. According to an exemplary embodiment of the present invention instruction cache 111 may be a single clock access, sixteen kilobyte (16 KB), four (4) way set associative cache and TLB 113 may be an eight (8) entry, fully associative, translation look-aside buffer for data and an eight (8) entry, fully associative, translation look-aside buffer for instructions. TLB 113 performs necessary address translations when in protected mode.

TLB 113 may also comprise a second-level (L2) unified (instruction and data), sixty four (64) entry, two (2) way set associative TLB that is accessed when there is a miss to the instruction TLB or the data TLB. The L2 unified TLB takes an additional clock to access. When there is a miss to the instruction or data caches or the TLB, the access must go to memory controller 180 for processing. The use of instruction cache 111, data cache 112 and their associated TLB in TLB 113 improves the overall efficiency of integer unit 115 by enabling simultaneous access to both instruction cache 111 and data cache 112.

Floating-point unit (FPU) 116 is a pipelined arithmetic unit that performs floating-point operations in accordance with the IEEE 754 standard. FPU 116 is a pipelined machine with dynamic scheduling of instructions to minimize stalls due to data dependencies. FPU 116 performs out-of-order execution and register renaming. FPU 116 is designed to support an instruction issue rate of one instruction per clock from the integer core. The data path is optimized for single precision arithmetic. Extended precision instructions are handled in microcode and require multiple passes through the pipeline. According to an exemplary embodiment, FPU 116 comprises an execution pipeline and a load/store pipeline, thereby enabling load/store operations to execute in parallel with arithmetic instructions.

Control processor 120 is responsible for reset control, macro-clock management, and debug support provided in processing system 100. Control processor 120 comprises a JTAG interface and the scan chain control logic. Control processor 120 supports chip reset, which includes initial phase-locked loop (PLL) control and programming, and runtime power management macro-clock control. The JTAG support includes a TAP controller that is IEEE 1149.1 compliant. CPU control can be obtained through the JTAG interface into the TAP Controller, and all internal registers, including CPU core 110 registers, may be accessed. In-circuit emulation (ICE) capabilities are supported through the JTAG and TAP Controller interface.

As noted above, internal bus 160 comprises two interface units: IU0 170 and IU1 175. IU0 170 connects six (6) high-speed modules together with a seventh link to IU1 175. IU1 175 connects to three (3) low-speed modules, namely I/O companion IF 135, PCI bridge 140, and TFT/DSTN controller 145.

Memory controller 180 is the memory source for all memory accesses in processing system 100. Memory controller 180 supports a memory data bus width of sixty four (64) bits. Memory controller 180 supports two types of memory. The first type of memory is a 111 MHz 222 MT/S for DDR (Dual Data Rate). The second type of memory is a 133 MHz for SDR (Single Data Rate). Memory controller 180 supports up to one gigabyte (1 GB) of either SDR memory or DDR memory.

The modules that need access to memory are CPU core 110, graphics processor 125, display controller 130, and TFT/DSTN controller 145. Because memory controller 180 supports memory needs for both CPU core 110 and the display subsystem, memory controller 180 is classically referred to as a Unified Memory Architecture (UMA) memory subsystem. According to an exemplary embodiment of the present invention, graphics processor 125 is a BitBLT/vector engine that supports pattern generation, source expansion, pattern/source transparency, and 256 ternary raster operations.

Display controller 130 performs the following functions: 1) retrieval of graphics, video, and overlay streams from the frame buffer; 2) serialization of the streams; 3) any necessary color look-ups and output formatting; and 4) interfacing with the display filter for driving the display device(s) (not shown). Display controller 130 may comprise a graphical user interface (GUI) and a VGA, which provides full hardware compatibility with the VGA graphics standard. The VGA passes eight (8) bit pixels and sync signals to the GUI, which expands the pixels to twenty four (24) BPP via the color lookup table and passes the information to video processor 150. Video processor 150 ultimately generates the digital red, green, and blue signals and buffers the sync signals, which are then sent to DAC 155 or the flat panel interface.

Video processor 150 mixes the graphics and video streams, and outputs digital RGB data to DAC 155 or the flat panel interface, depending upon the part (i.e., cathode ray tube (CRT) or flat panel (FP)). Video processor 150 is capable of delivering high resolution and true color graphics. Video processor 150 may also overlay or blend a scaled true color video image on the graphics background.

TFT/DSTN controller 145 converts the digital RGB output of a video mixer block to the digital output suitable for driving a dual-scan color STN (DSTN) flat panel LCD. TFT/DSTN controller 145 connects to the digital RGB output of video processor 150 and drives the graphics data onto a dual-scan flat panel LCD. According to an exemplary embodiment, TFT/DSTN controller 145 may drive all standard dual-scan color STN flat panels up to 1024×768 resolution.

PCI bridge 140 contains all the necessary logic to support a standard external PCI interface. The PCI interface is PCI 2.2 specification compliant. PCI bridge 140 comprises the PCI and Interface Unit control, read and write FIFOs, and a PCI arbiter. I/O companion IF 135 handles several unique signals that support system reset, system interrupts, and power system managements.

Figure 2:
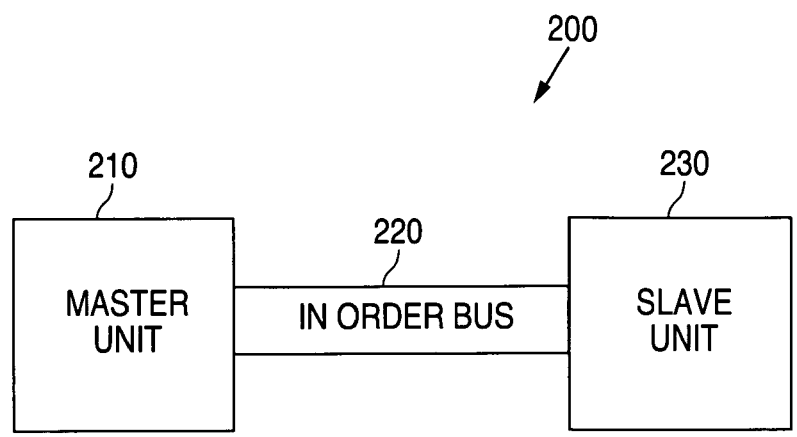
FIG. 2 illustrates a prior art data bus system comprising a master unit that sends "in order" data to a slave unit through an "in order" bus.

FIG. 2 illustrates a prior art data bus system 200. Data bus system 200 comprises a master unit 210 that sends data transactions to a slave unit 230 through an "in order" bus 220. When master unit 210 sends a plurality of data transactions through "in order" bus 220, slave unit 230 receives the data transactions and executes the data transactions exactly in the order that they are received by slave unit 230. That is why bus 220 is referred to as an "in order" bus. The data transactions are executed in order of their arrival in slave unit 230. When slave unit 230 receives data transactions on "in order" bus 220, slave unit 230 cannot reorder the execution of the data transactions to optimize the utilization of slave unit resources (e.g., dynamic random access memory).

Figure 3:
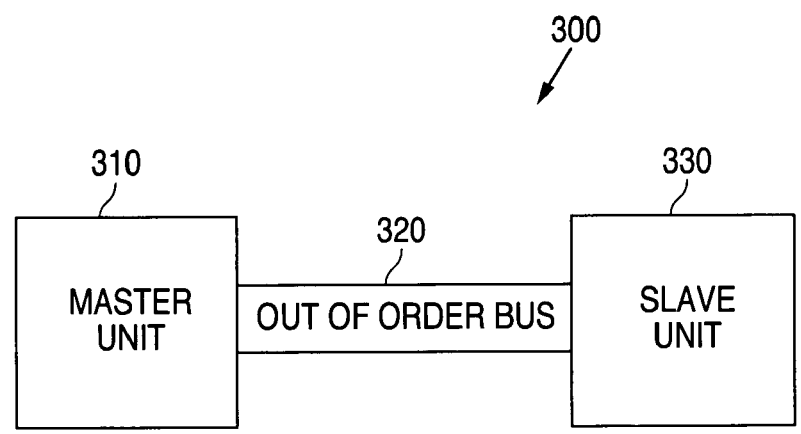
FIG. 3 illustrates a prior art data bus system comprising a master unit that sends "out of order" data to a slave unit through an "out of order" bus.

FIG. 3 illustrates a prior art data bus system 300. Data bus system 300 comprises a master unit 310 that sends data transactions to a slave unit 330 through an "out of order" bus 320. When master unit 310 sends a plurality of data transactions over "out of order" bus 320, slave unit 330 receives the data transactions in the order in which they were sent by master unit 310, but slave unit 330 does not necessarily execute the data transactions in the order in which they were received. Slave unit 330 can reorder the execution of the data transactions to optimize the utilization of slave unit resources (e.g., dynamic random access memory).

But the use of "out of order" bus 320 increases latencies for master unit 310 and requires master unit 310 to provide reordering buffering for the data transactions. In some cases the order in which the data transactions are to be executed by slave unit 330 is relevant. In those cases the use of "out of order" bus 320 prevents master unit 310 from controlling the ordering of the data transactions. The present invention solves these difficulties by providing an apparatus and method that can handle both "in order" data and "out of order" data on the same data bus.

Figure 4:
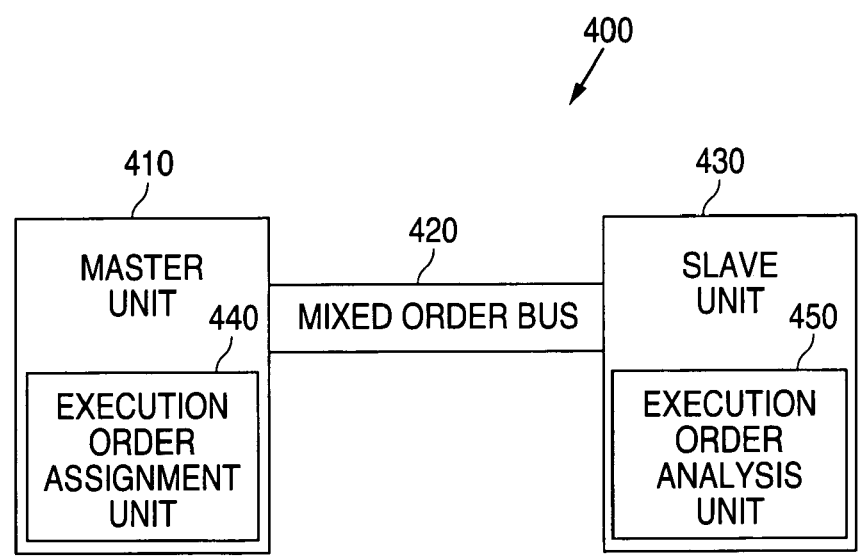
FIG. 4 illustrates an advantageous embodiment of the present invention comprising a master unit and a slave unit and a mixed order data bus in which the data bus is capable of sending "in order" data and "out of order" data from the master unit to the slave unit.

FIG. 4 illustrates an advantageous embodiment of the present invention comprising a master unit 410 and a slave unit 430 coupled by a mixed order data bus 420. Mixed order data bus 420 is capable of sending "in order" data and "out of order" data from master unit 410 to slave unit 430. Master unit 410 comprises an execution order assignment unit 440. A "priority identifier" (abbreviated PID) is a value that is assigned to each data transaction that indicates whether the data transaction is to be sent and executed "in order" or is to be sent and executed "out of order." Execution order assignment unit 440 in master unit 410 assigns a priority identifier to the data transaction and sends the data transaction to slave unit 430 on mixed order data bus 420.

As shown in FIG. 4, slave unit 430 comprises an execution order analysis unit 450. Execution order analysis unit 450 is capable of reading the priority identifier of a data transaction and executing the data transaction either "in order" or "out of order" according to the value of the priority identifier.

Figure 5:
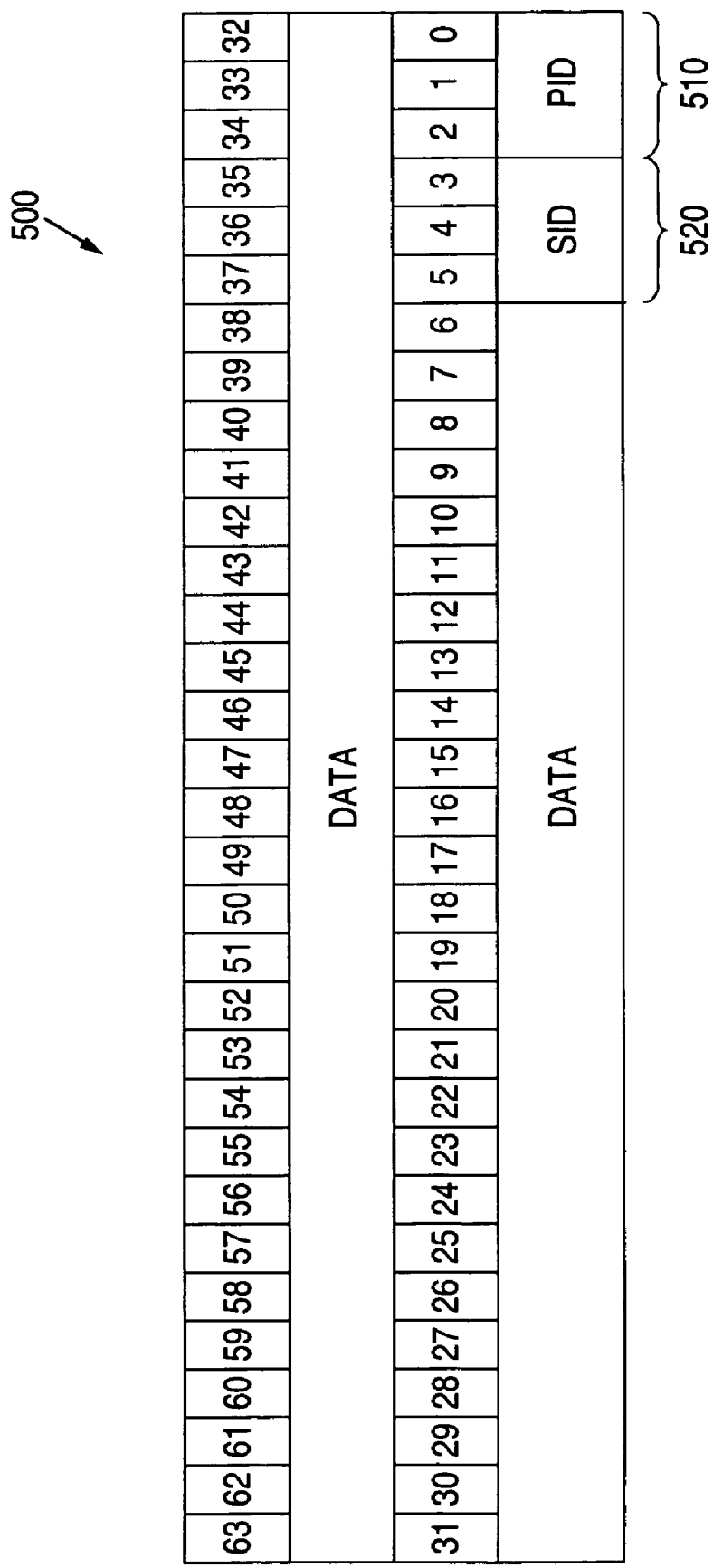
FIG. 5 illustrates a bit map of an exemplary data transaction of the present invention showing an exemplary location of source identification bits (SID bits) and priority identification bits (PID bits) that represent a stream identifier that indicates whether data is to be sent "in order" on the data bus or is to be sent "out of order" over the data bus.

FIG. 5 illustrates a bit map 500 of an exemplary data transaction of the present invention showing an exemplary location of PID bits 510 that represent a priority identifier that has been assigned to the data transaction. The PID bits 510 in bit map 500 comprise three (3) bits denoted 0, 1 and 2. The use of three bits is merely an example. The invention is not limited to the use of three PID bits. In general, any integer number, N, of PID bits may be used. In the case shown in FIG. 5, where N equals three, the three PID bits 510 allow up to eight (i.e., $2^3$) different priority identifiers to be used. In general, the number of different priority identifiers available to be used will be equal to $2^N$.

Bit map 500 in FIG. 5 also comprises exemplary source identifier bits 520 (SID bits 520). SID bits 520 contain a source identifier value that is assigned to the data transaction. The source identifier value indicates the source of the data transaction. In the example shown in FIG. 4, the source of the data transaction is master unit 410. Of course, there will be many data transactions on mixed order bus 420 from a number of different sources. The source identifier bits (SID bits 520) in each data transaction identify the source that originated the data transaction. The SID bits 520 in bit map 500 comprise three (3) bits denoted 3, 4, and 5. The use of three bits is merely an example. The invention is not limited to the use of three SID bits. In general, any integer number, M, of SID bits may be used. In the case shown in FIG. 5, where M equals three, the three SID bits 520 allow up to eight (i.e., $2^3$) different source identifier values to be used. In general, the number of different source identifier values available to be used will be equal to $2^M$.

The priority identifier bits (PID) 510 and the source identifier bits (SID) 520 together make up a "stream identifier." The stream identifier bits (collectively 510 and 520) for each data transaction may be read by execution order analysis unit 450 in slave unit 430.

Figure 6:
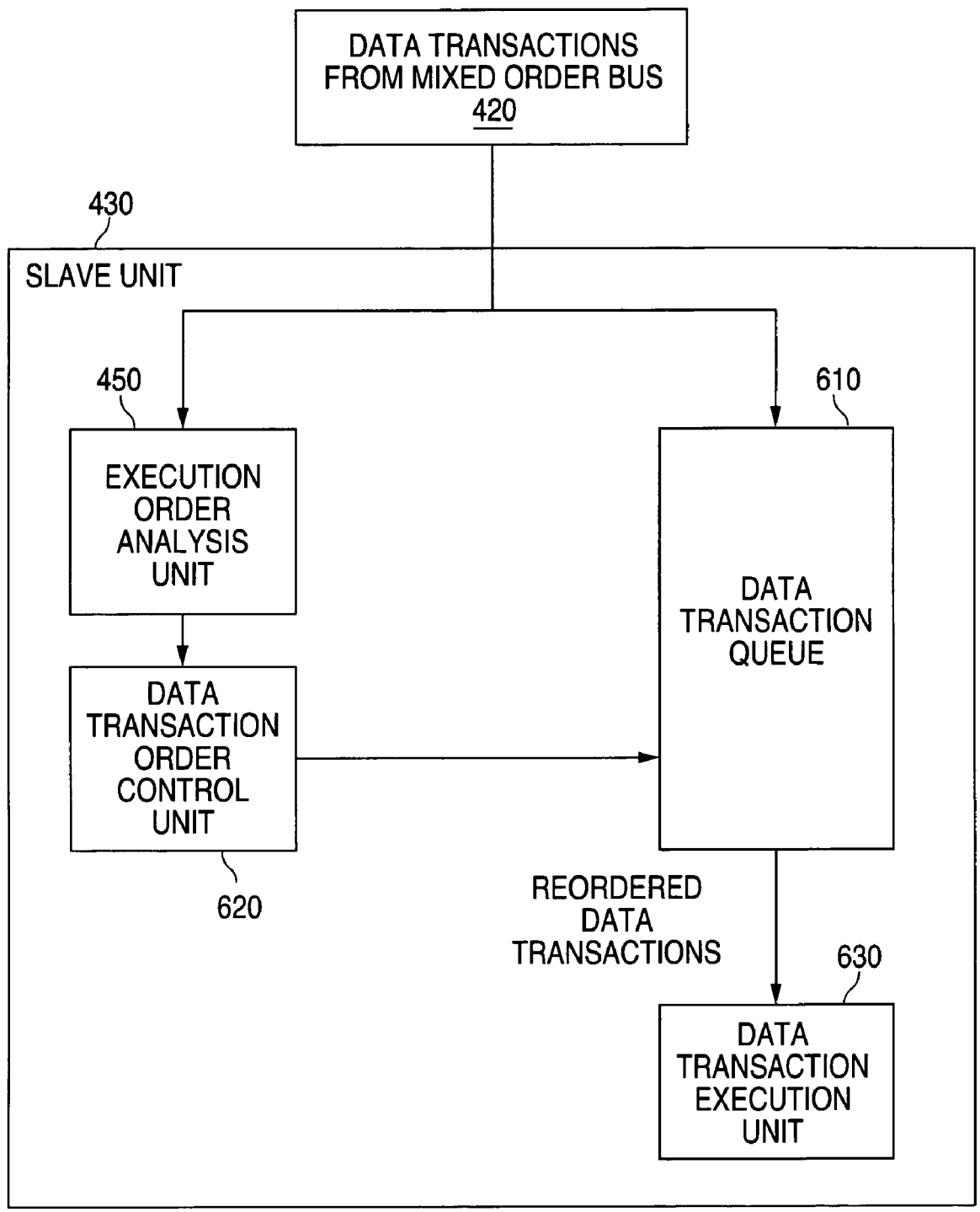
FIG. 6 illustrates a slave unit in accordance with the principles of the present invention showing the location of an execution order analysis unit of the present invention.

FIG. 6 illustrates slave unit 430 of the present invention in more detail. As shown in FIG. 6, slave unit 430 receives "in order" data transactions and "out of order" data transactions from mixed order bus 420. The data transactions from mixed order bus 420 are provided to execution order analysis unit 450 and to data transaction queue 610. The data transactions are stored in data transaction queue 610.

Execution order analysis unit 450 reads the priority identifier bits 510 (PID bits 510) and the source identifier bits 520 (SID bits 520) to obtain the stream identifier for the data transaction. Execution order analysis unit 450 then compares the stream identifier of the data transaction with the stream identifiers of other data transactions that have already been received.

In making the comparison of stream identifiers, execution order analysis unit 450 reads the priority identifier in the PID bits 510 of each data transaction to determine whether the data transaction is to be executed as an "in order" data transaction or is to be executed as an "out of order" data transaction.

Execution order analysis unit 450 then determines an optimum order for executing the data transaction based on the comparison of stream identifiers of the data transactions and based on the current state of resource utilization of slave unit 450. Execution order analysis unit 450 obtains information concerning the current state of resource utilization of slave unit 450 by accessing a memory controller (not shown) for slave unit 450.

Execution order analysis unit 450 then passes the optimum execution order information to data transaction order control unit 620. Data transaction order control unit 620 then rearranges the order of the data transactions in data transaction queue 610 to establish the optimum execution order for the data transactions.

Data transaction queue 610 sends the reordered data transactions to data transaction execution unit 630. Data transaction execution unit 630 then executes the reordered data transactions. In this manner the data transactions that are supposed to be executed "in order" are executed "in order" by data transaction execution unit 630. The data transactions that are supposed to be executed "out of order" are executed "out of order" by data transaction execution unit 630.

Execution order analysis unit 450 is capable of reordering data transactions that have a unique priority identifier. If two or more data transactions have the same priority identifier the data transactions are executed as "in order" data transactions. An unlimited number of "in order" data transactions can be executed. In the present example there are eight (8) unique priority identifiers available. This means that there can be eight (8) data transactions that are executed as "out of order" data transactions. In other embodiments the number of "out of order" data transactions available will be equal to $2^N$ where N is an integer.

Figure 7:
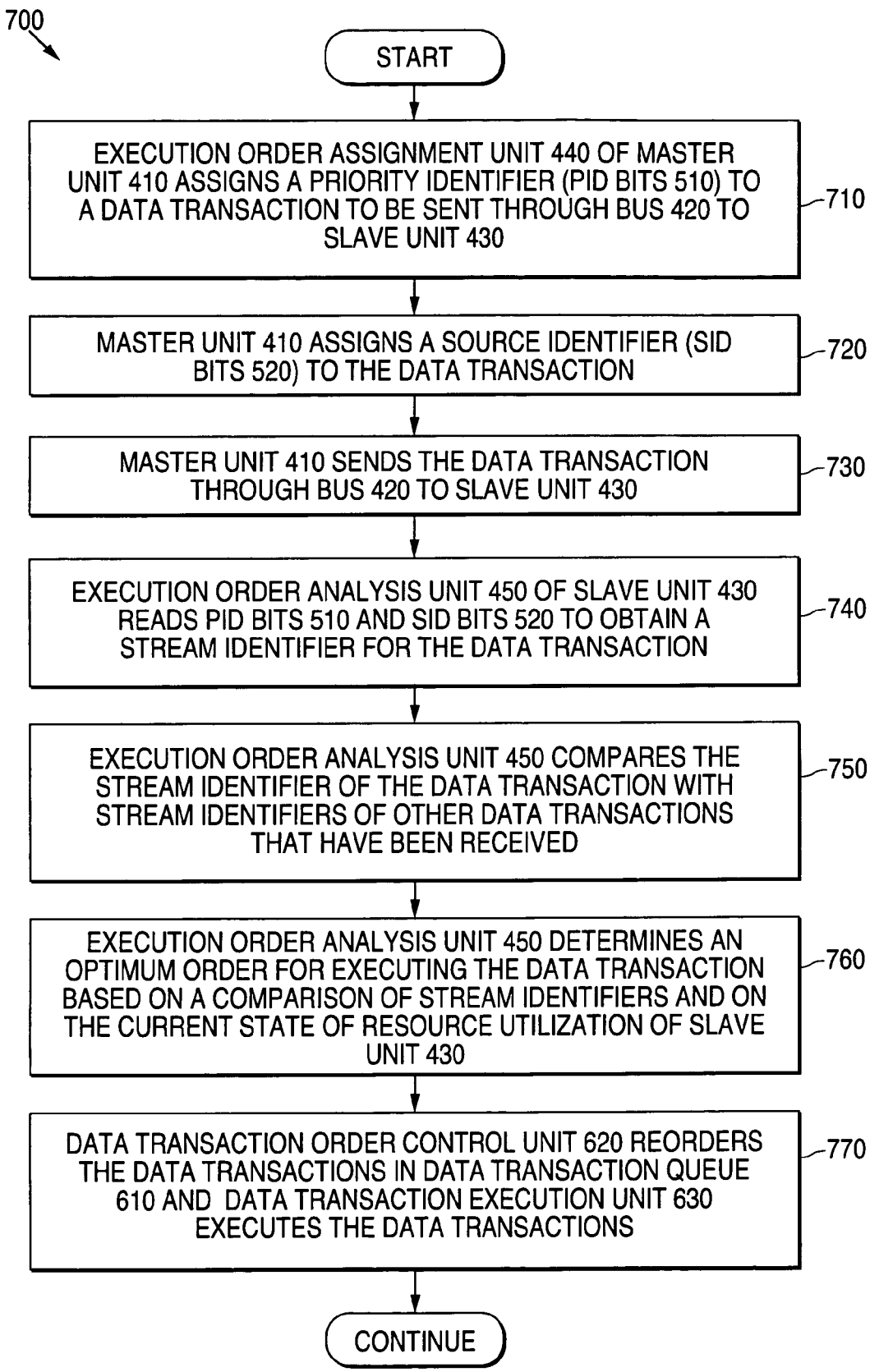
FIG. 7 illustrates a flow chart showing the operation of an advantageous embodiment of a method of the present invention.

FIG. 7 illustrates a flow chart showing the operation of an advantageous embodiment of a method of the present invention for sending both "in order" data transactions and "out of order" data transactions over mixed order data bus 420. The steps of the method shown in FIG. 7 are generally denoted with reference numeral 700.

Execution order assignment unit 440 of master unit 410 assigns a priority identifier (PID bits 510) to a data transaction that is to be sent through mixed order bus 420 to slave unit 430 (step 710). Master unit 410 then assigns a source identifier (SID bits 520) to the data transaction (step 720). Then master unit 410 sends the data transaction through mixed order bus 420 to slave unit 430 (step 730).

Execution order analysis unit 450 of slave unit 430 reads the PID bits 510 and the SID bits 520 to obtain a stream identifier for the data transaction (step 740). Execution order analysis unit 450 compares the steam identifier of the data transaction with the stream identifiers of other data transactions that have been previously received (step 750). The previously received data transactions have been stored in data transaction queue 610.

Execution order analysis unit 450 then determines an optimum order for executing the data transaction based on (1) a comparison of stream identifiers, and (2) the current state of resource utilization of slave unit 430 (step 760). In making the comparison of stream identifiers, execution order analysis unit 430 determines that (1) the current data transaction is to be executed "in order" with the other data transactions that have the same priority identifier as the current data transaction, and that (2) the current data transaction is to be executed "out of order" with the other data transactions if the priority identifier of the current data transaction is different than the priority identifiers of the other data transactions.

Execution order analysis unit 450 then passes the optimum execution order information to data transaction order control unit 620. Data transaction order control unit 620 reorders the data transactions in data transaction queue 610 in accordance with the optimum execution order information and data transaction execution unit 630 executes the data transactions (step 770).

Although the present invention has been described with an exemplary embodiment, various changes and modifications may be suggested to one skilled in the art. It is intended that the present invention encompass such changes and modifications as fall within the scope of the appended claims.

What is claimed is:

1. For use with a master unit and a slave unit that are coupled together by a data bus, wherein said master unit is capable of sending a data transaction to said slave unit through said data bus, and wherein said slave unit is capable of executing said data transaction, an apparatus comprising:

an apparatus for causing said slave unit to execute said data transaction by one of executing said data transaction "in order" with respect to other data transactions received by said slave unit and executing said data transaction "out of order" with respect to other data transactions received by said slave unit;

an execution order assignment unit in said master unit that is capable of assigning a priority identifier to said data transaction, wherein said priority identifier indicates whether said data transaction is to be executed "in order" or "out of order" with respect to other data transactions; and an execution order analysis unit in said slave unit that is capable of determining said priority identifier assigned to said data transaction, and in response to said determination, causing said data transaction to be executed as one of an "in order" data transaction and an "out of order" data transaction.

2. The apparatus as set forth in claim 1 wherein said master unit is capable of assigning a source identifier to said data transaction wherein said source identifier and said priority identifier in said data transaction comprise a stream identifier for said data transaction; and wherein said execution order analysis unit is capable of comparing a stream identifier of said data transaction with a plurality of stream identifiers of other data transactions.

3. The apparatus as set forth in claim 2 wherein said execution order analysis unit is capable of determining an optimum order of execution of said data transaction based on one of: a comparison of said stream identifier of said data transaction with said plurality of stream identifiers of said other data transactions and a current state of resource utilization of said slave unit.

4. The apparatus as set forth in claim 3 wherein said execution order analysis unit causes said data transaction to be executed "in order" with respect to other data transactions that have a same priority identifier as said data transaction.

5. The apparatus as set forth in claim 3 wherein said execution order analysis unit causes said data transaction to be executed "out of order" with respect to other data transactions that have a different priority identifier than said data transaction.

6. The apparatus as set forth in claim 3 wherein said slave unit further comprises:

a data transaction queue coupled to said data bus said data transaction queue capable of containing a plurality of data transactions received from said data bus;

a data transaction execution unit coupled to said data transaction queue said data transaction execution unit capable of executing data transactions received from said data transaction queue; and a data transaction order control unit coupled to said execution order analysis unit, said data transaction order control unit capable of reordering an order of execution of said plurality of data transactions in said data transaction queue in response to receiving from said execution order analysis unit said optimum order of execution of said data transaction.

7. A data processor comprising:

a master unit capable of sending a data transaction;

a slave unit capable of executing said data transaction;

a data bus coupled to said master unit and to said slave unit, said data bus capable of sending said data transaction from said master unit to said slave unit;

an apparatus capable of causing said slave unit to execute said data transaction by one of: executing said data transaction "in order" with respect to other data transactions received by said slave unit and executing said data transaction "out of order" with respect to other data transactions received by said slave unit;

an execution order assignment unit in said master unit that is capable of assigning a priority identifier to said data transaction, wherein said priority identifier indicates whether said data transaction is to be executed "in order" or "out of order" with respect to other data transactions; and an execution order analysis unit in said slave unit that is capable of determining said priority identifier assigned to said data transaction, and in response to said determination, causing said data transaction to be executed as one of: an "in order" data transaction and an "out of order" data transaction.

8. The data processor as set forth in claim 7 wherein said master unit is capable of assigning a source identifier to said data transaction, wherein said source identifier and said priority identifier in said data transaction comprise a stream identifier for said data transaction; and wherein said execution order analysis unit is capable of comparing a stream identifier of said data transaction with a plurality of stream identifiers of other data transactions.

9. The data processor as set forth in claim 8 wherein said execution order analysis unit is capable of determining an optimum order of execution of said data transaction based on one of:

a comparison of said stream identifier of said data transaction with said plurality of stream identifiers of said other data transactions and a current state of resource utilization of said slave unit.

10. The data processor as set forth in claim 9 wherein said execution order analysis unit causes said data transaction to be executed "in order" with respect to other data transactions that have a same priority identifier as said data transaction.

11. The data processor as set forth in claim 9 wherein said execution order analysis unit causes said data transaction to be executed "out of order" with respect to other data transactions that have a different priority identifier than said data transaction.

12. The data processor as set forth in claim 8 wherein said slave unit further comprises:

a data transaction queue coupled to said data bus said data transaction queue capable of containing a plurality of data transactions received from said data bus;

a data transaction execution unit coupled to said data transaction queue said data transaction execution unit capable of executing data transactions received from said data transaction queue; and a data transaction order control unit coupled to said execution order analysis unit said data transaction order control unit capable of reordering an order of execution of said plurality of data transactions in said data transaction queue in response to receiving from said execution order analysis unit an optimum order of execution of said data transaction.

13. For use with a master unit and a slave unit that are coupled together by a data bus, wherein said master unit is capable of sending a data transaction to said slave unit through said data bus, and wherein said slave unit is capable of executing said data transaction, a method for causing said slave unit to execute said data transaction, said method comprising:

one of executing said data transaction "in order" with respect to other data transactions received by said slave unit and executing said data transaction "out of order" with respect to other data transactions received by said slave unit;

assigning a priority identifier to said data transaction with an execution order assignment unit in said master unit, wherein said priority identifier indicates whether said data transaction is to be executed "in order" or "out of order" with respect to other data transactions;

determining said priority identifier assigned to said data transaction with an execution order analysis unit in said slave unit; and in response to said determination, causing said slave unit to execute said data transaction as one of: an "in order" data transaction and an "out of order" data transaction.

14. The method as set forth in claim 13 further comprising assigning a source identifier to said data transaction, wherein said source identifier and said priority identifier in said data transaction comprise a stream identifier for said data transaction; and comparing in said execution order analysis unit a stream identifier of said data transaction with a plurality of stream identifiers of other data transactions.

15. The method as set forth in claim 14 further comprising:

determining in said execution order analysis unit an optimum order of execution of said data transaction based on one of:

a comparison of said stream identifier of said data transaction with said plurality of steam identifiers of said other data transactions and a current state of resource utilization of said slave unit.

16. The method as set forth in claim 15 further comprising:

causing said data transaction to be executed in said slave unit "in order" with respect to other data transactions that have a same priority identifier as said data transaction.

17. The method as set forth in claim 15 further comprising:

causing said data transaction to be executed in said slave unit "out of order" with respect to other data transactions that have a different priority identifier than said data transaction.

18. The method as set forth in claim 15 further comprising:

receiving a first plurality of data transactions from said data bus in a data transaction queue in said slave unit;

storing said first plurality of data transactions from said data bus in said data transaction queue in said slave unit sending a priority identifier for said data transaction from said execution order analysis unit to a data transaction order control unit in said slave unit;

in response to receiving said priority identifier in said data transaction order control unit, reordering an order of execution of said data transaction with respect to said first plurality of data transactions in said data transaction queue;

sending said reordered data transactions from said data transaction queue to a data transaction execution unit; and executing said reordered data transactions from said data transaction queue in said data transaction execution unit.

* * * * *